US006944383B1

(12) United States Patent
Herzog et al.

(10) Patent No.: US 6,944,383 B1
(45) Date of Patent: Sep. 13, 2005

(54) CABLE MANAGEMENT PANEL WITH SLIDING DRAWER AND METHODS

(75) Inventors: Daniel M. Herzog, Chanhassen, MN (US); Chad J. Sjodin, Shakopec, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/823,402

(22) Filed: Apr. 12, 2004

(51) Int. Cl.$^7$ ................................................ G02B 6/00
(52) U.S. Cl. .......................... 385/123; 174/50; 211/26; 439/502
(58) Field of Search ................................ 385/134–136, 385/147; 211/26; 439/502, 623; 174/71 R, 174/72 A, 50, 72 R (56) References Cited

U.S. PATENT DOCUMENTS

| 4,792,203 | A | 12/1988 | Nelson et al. |
|---|---|---|---|
| 5,066,149 | A | 11/1991 | Wheeler et al. |
| 5,497,444 | A | 3/1996 | Wheeler |
| 5,546,495 | A | 8/1996 | Bruckner et al. |
| 5,566,269 | A | 10/1996 | Eberle, Jr. et al. |
| 5,613,030 | A | 3/1997 | Hoffer et al. |
| 5,640,482 | A | 6/1997 | Barry et al. |
| 5,754,723 | A | 5/1998 | Fremgen |
| 5,946,440 | A | 8/1999 | Puetz |
| 6,250,816 | B1 | 6/2001 | Johnston et al. |
| 6,396,989 | B1 | 5/2002 | Johnston et al. |
| 6,438,310 | B1 | 8/2002 | Lance et al. |
| 6,504,986 | B1 | 1/2003 | Wambeke et al. |
| 6,504,988 | B1 | 1/2003 | Trebesch et al. |
| 6,715,619 | B2 * | 4/2004 | Kim et al. ..................... 211/26 |
| 6,748,155 | B2 * | 6/2004 | Kim et al. ................. 385/135 |
| 2003/0072551 | A1 * | 4/2003 | Douglas et al. ............. 385/135 |
| 2004/0011750 | A1 * | 1/2004 | Kim et al. ..................... 174/50 |
| 2004/0013390 | A1 * | 1/2004 | Kim et al. ................. 385/135 |
| 2004/0028368 | A1 | 2/2004 | Hileman et al. |

FOREIGN PATENT DOCUMENTS

WO    WO 03/005095 A2    1/2003

OTHER PUBLICATIONS

Tyco Electronics Raychem NV, "FIST Generic Rack," *FIST-GR2*, 2 pages (Jan. 2004).
Tyco Electronics Raychem NV, "FIST Generic Splice/Patch Shelf," *FIST-GPR2*, 2 pages (Aug. 2002).
Tyco Electronics Raychem NV, "Patching & Splicing Shelf," *FIST-GPS2/GPST-12 Installation Instruction*, pp. 1-23 (Jan. 2001).
Tyco Electronics Raychem VN, "FIST Generic Splicing Shelf," *FIST-GSS2*, 2 pages (Dec. 1999).

* cited by examiner

*Primary Examiner*—Akm Enayet Ullah
(74) *Attorney, Agent, or Firm*—Merchant & Gould P.C.

(57) ABSTRACT

A cable management panel for telecommunications cables. A chassis holds a slideable drawer. The drawer includes cable terminations or splices. The drawer further includes a radius limiter which moves with synchronized movement with movement of the drawer. Cables enter the chassis through a side wall, such as located adjacent the rear of the chassis. The radius limiter manages a slack loop of cable disposed within the chassis.

11 Claims, 9 Drawing Sheets

CABLE MANAGEMENT PANEL WITH SLIDING DRAWER AND METHODS

TECHNICAL FIELD

This disclosure concerns management of optical fiber cables. In particular, this disclosure relates to storage of optical fiber cables and devices in the telecommunications industry.

BACKGROUND OF THE INVENTION

Cable termination, splice, and storage devices are known including, for example, devices shown in U.S. Pat. Nos. 4,792,203 and 5,946,440, both assigned to ADC Telecommunications, Inc. Both of these patents concern devices with movable trays for storage and management of the optical fiber cables. U.S. Pat. No. 5,066,149, also assigned to ADC Telecommunications, Inc., concerns a cable management device including slidable drawers, each including a cable slack take-up mechanism. When moving the trays or drawers, unnecessary or excessive displacement of the optical fiber cables is undesirable. As the optical fiber cables are displaced, they are subject to bending and other forces. Bending of the fibers can cause attenuation and loss of signal strength. As the fiber bends, the fiber can also break, resulting in a loss of transmission through the fiber.

U.S. Pat. Nos. 6,438,310 and 6,504,988, both assigned to ADC Telecommunication, Inc., show additional cable management and distribution structures including slidable drawers. U.S. Pat. No. 6,504,988 includes a radius limiter movable relative to the drawer with synchronized movement in order to manage cables within the drawer. Improvements are desirable.

SUMMARY OF THE INVENTION

A cable management panel includes a chassis, and at least one drawer slidably mounted within the chassis. The drawer is slidable between a first position with the drawer fully inserted within the chassis and a second position with the drawer extended from the interior of the chassis. An access location allows entry and exit of optical fiber cables into a side of the chassis. One aspect of the present invention includes a radius limiter slidably mounted on the drawer and further slidably mounted relative to the chassis. The radius limiter is moveable from a first position on the drawer toward a second position on the drawer which is forward of the first position as the drawer is moved from the second position to the first position. The radius limiter manages a slack loop of cable disposed within the chassis.

DETAILED DESCRIPTION OF THE PREFERRED EMBODIMENTS

Referring now to the several drawing figures in which identical elements are numbered identically, a cable management panel or module 10 according to the present invention is shown. Panel 10 includes a frame or chassis 12 with side brackets 24 for mounting to a rack, cabinet, enclosure, or other mounting fixture. Mounted within chassis 12 is a slidable drawer 14.

Chassis 12 defines an interior 22 for receiving drawer 14. Drawer 14 slides horizontally during use to access the interior of drawer 14. Cables are provided to panel 10 for management on drawer 14, such as through splicings, terminations, or other cable management functions.

Chassis 12 includes a front 16, an opposite rear 17, a top 18, and an opposite bottom 19. Chassis 12 further includes a left side 20 and a right side 21. Cables enter panel 10 through the sides 20, 21, as shown in FIGS. 6 and 7.

A plurality of panels 10 can be provided in the rack, cabinet, enclosure, or other mounting fixture. Each drawer 14 includes cable management structure, as will be described more fully below. Examples of cable management structure useable on drawer 14 include devices for storing the cables or connecting the cables to other cables and/or fiber optic devices, such as attenuators, couplers, switches, wave division multiplexers (WDMs), splitters/combiners, or splices. Various cable management devices and structures are shown and described in U.S. Pat. Nos. 6,438,310 and 6,504,988, the disclosures of which are hereby incorporated by reference.

Figure 1:
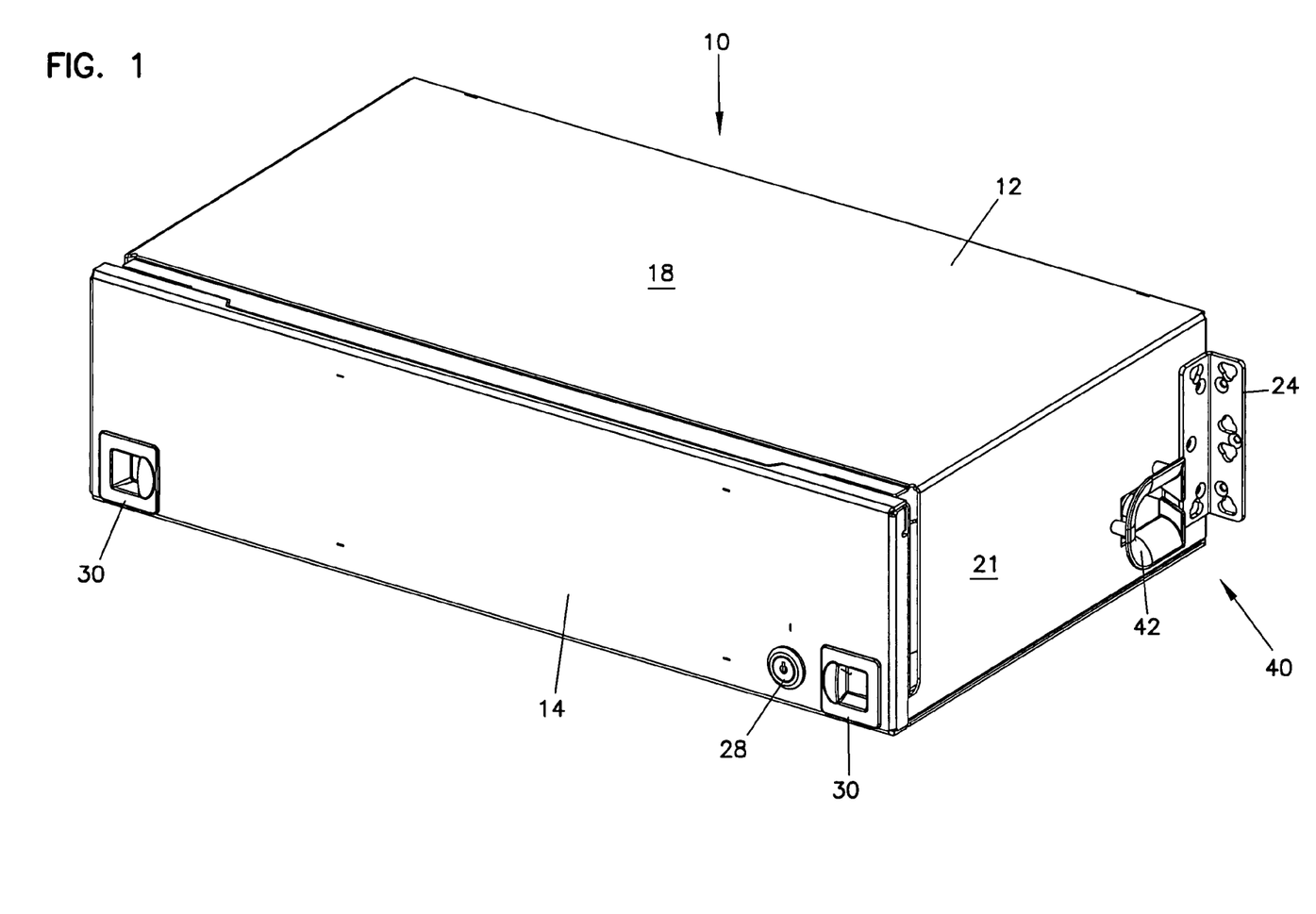
FIG. 1 is a front, top, and right side perspective view of a first embodiment of a cable management panel.
Figure 2:
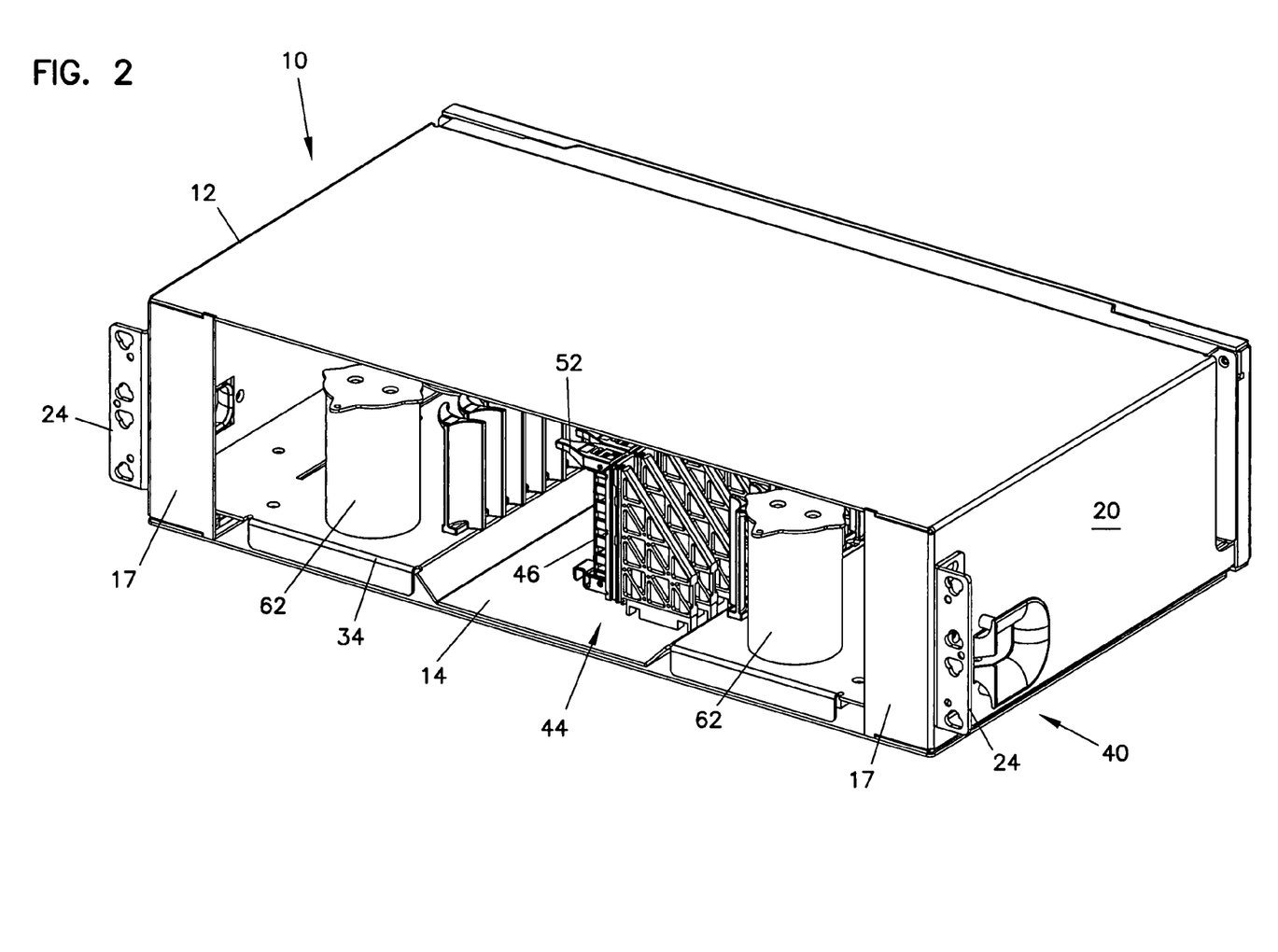
FIG. 2 is a rear, top, and left side perspective view of the cable management panel of FIG. 1.
Figure 3:
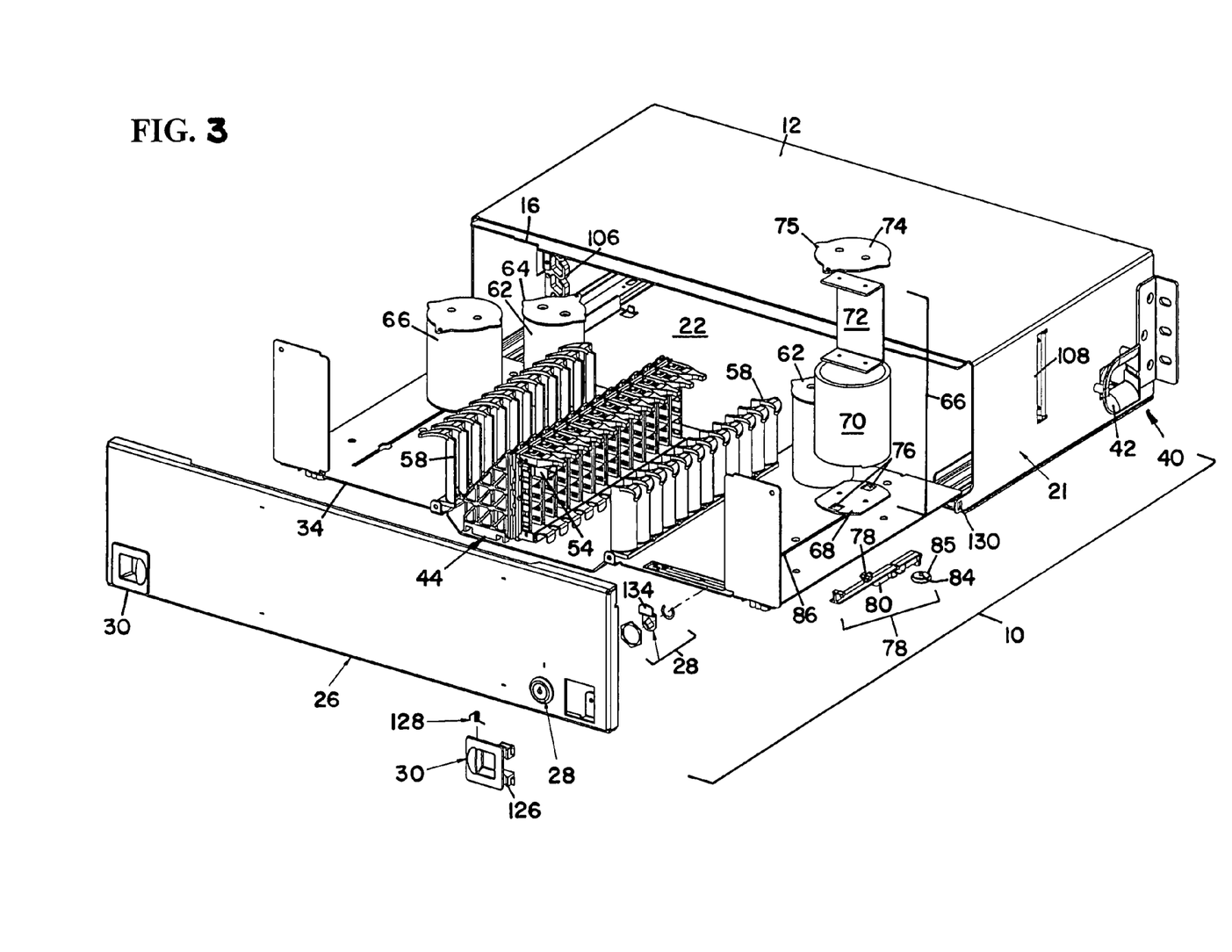
FIG. 3 is a partially exploded front, top, and right side perspective view of the cable management panel of FIG. 1.
Figure 4:
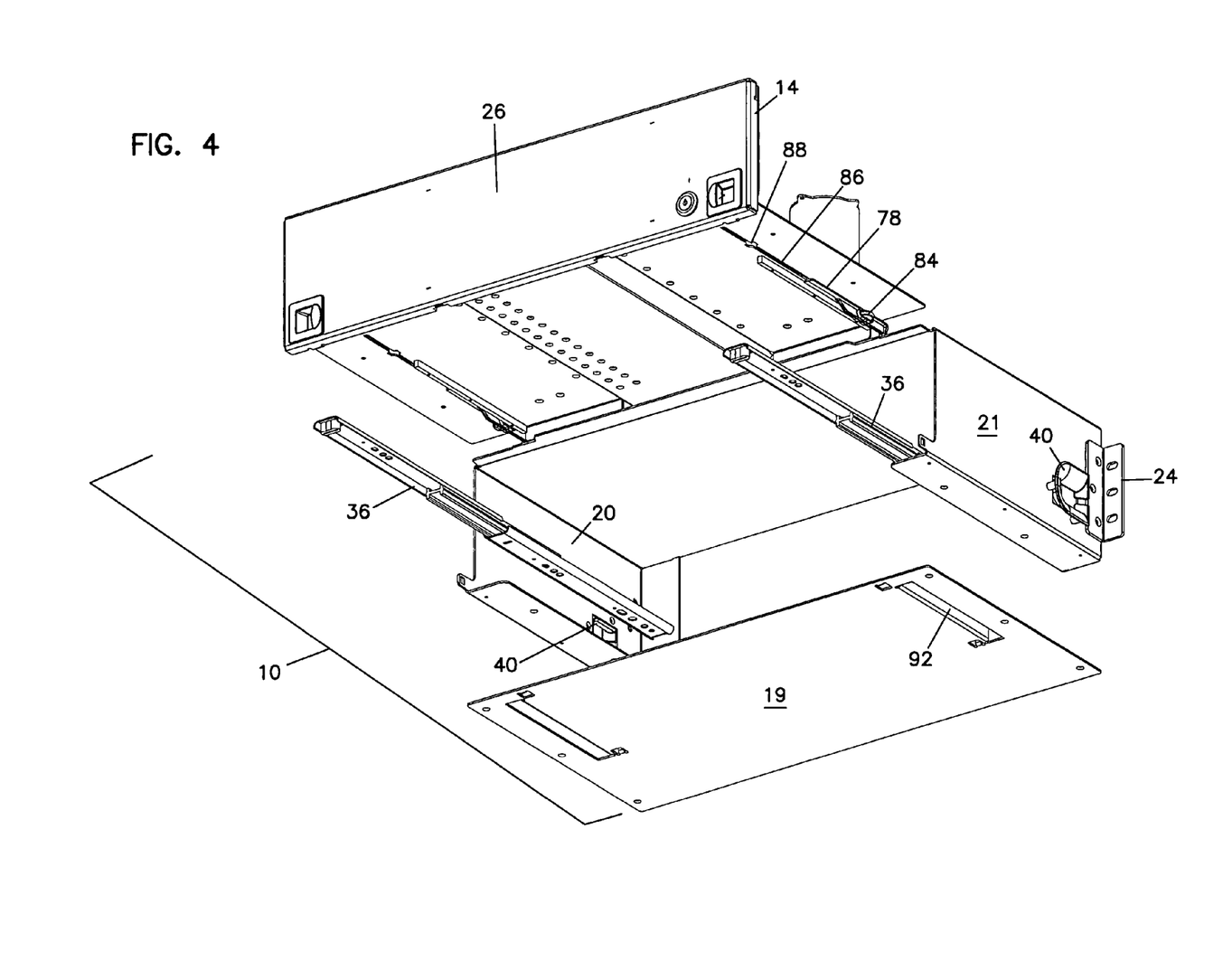
FIG. 4 is a partially exploded front, bottom, and right side perspective view of the cable management panel of FIG. 1.
Figure 5:
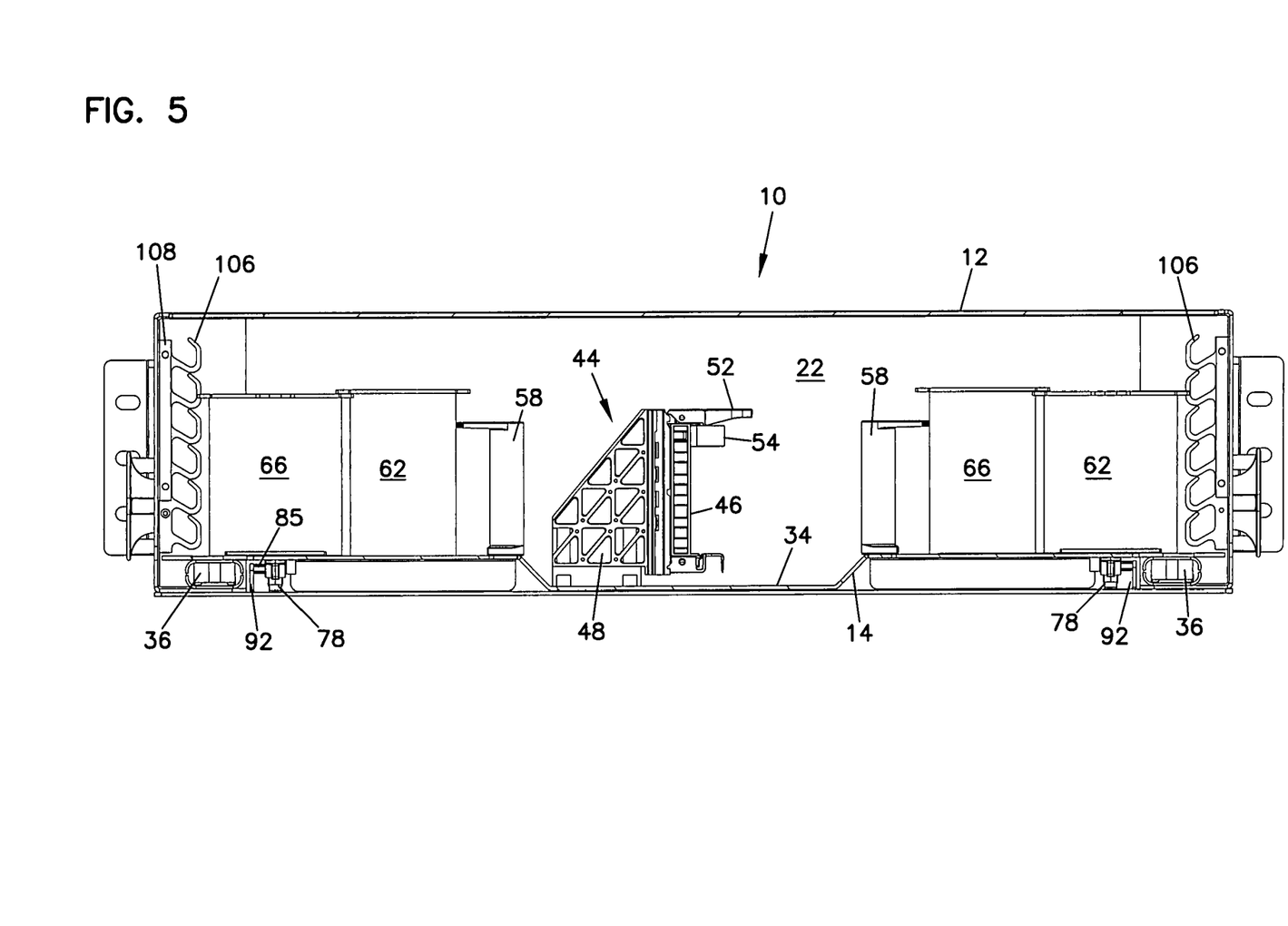
FIG. 5 is a cross-sectional front view of the cable management panel of FIG. 1 along a plane just inside the front panel.
Figure 6:
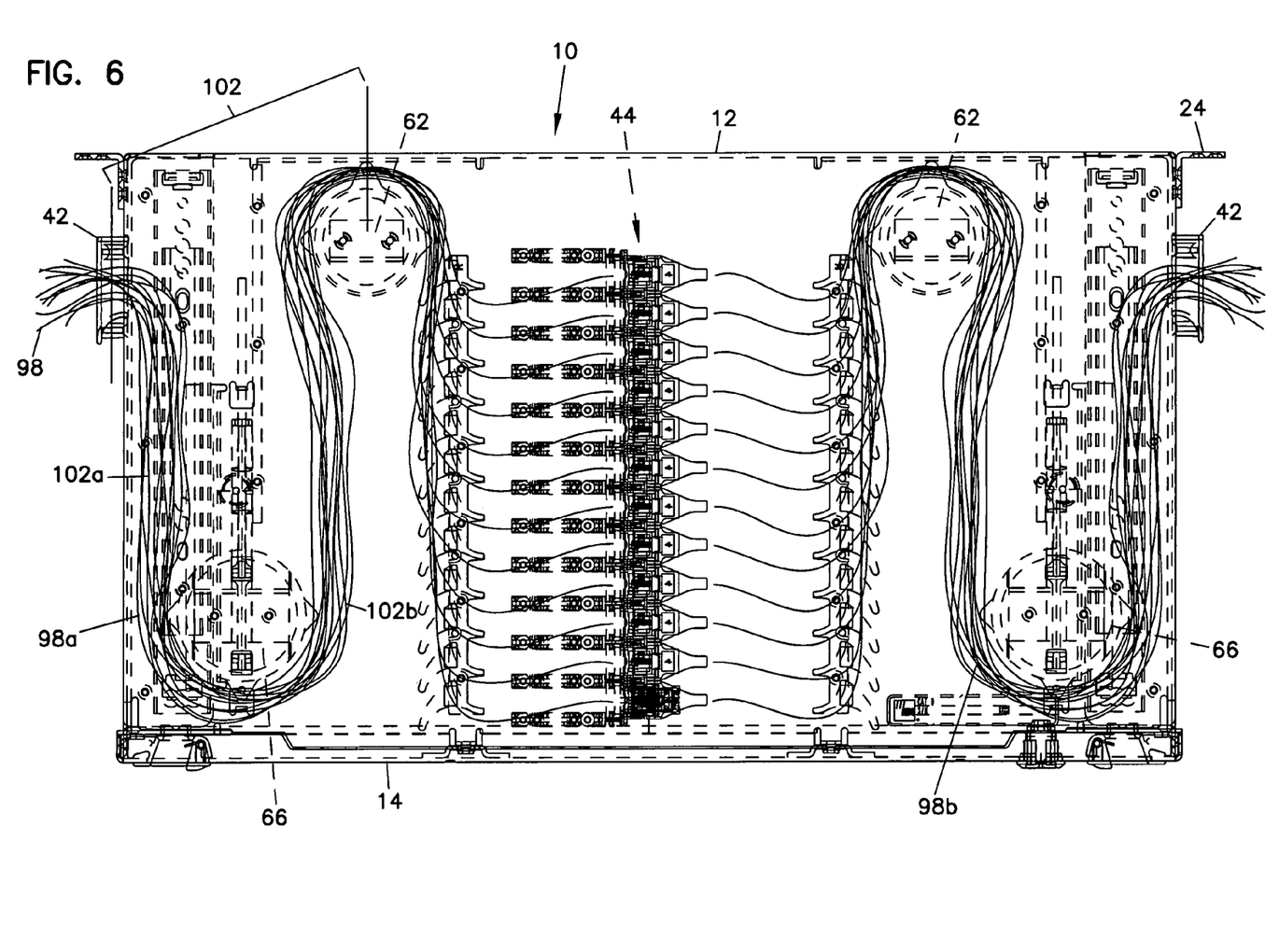
FIG. 6 is a top view of the cable management panel of FIG. 1 showing the drawer in the closed position and various cables positioned within the panel.
Figure 7:
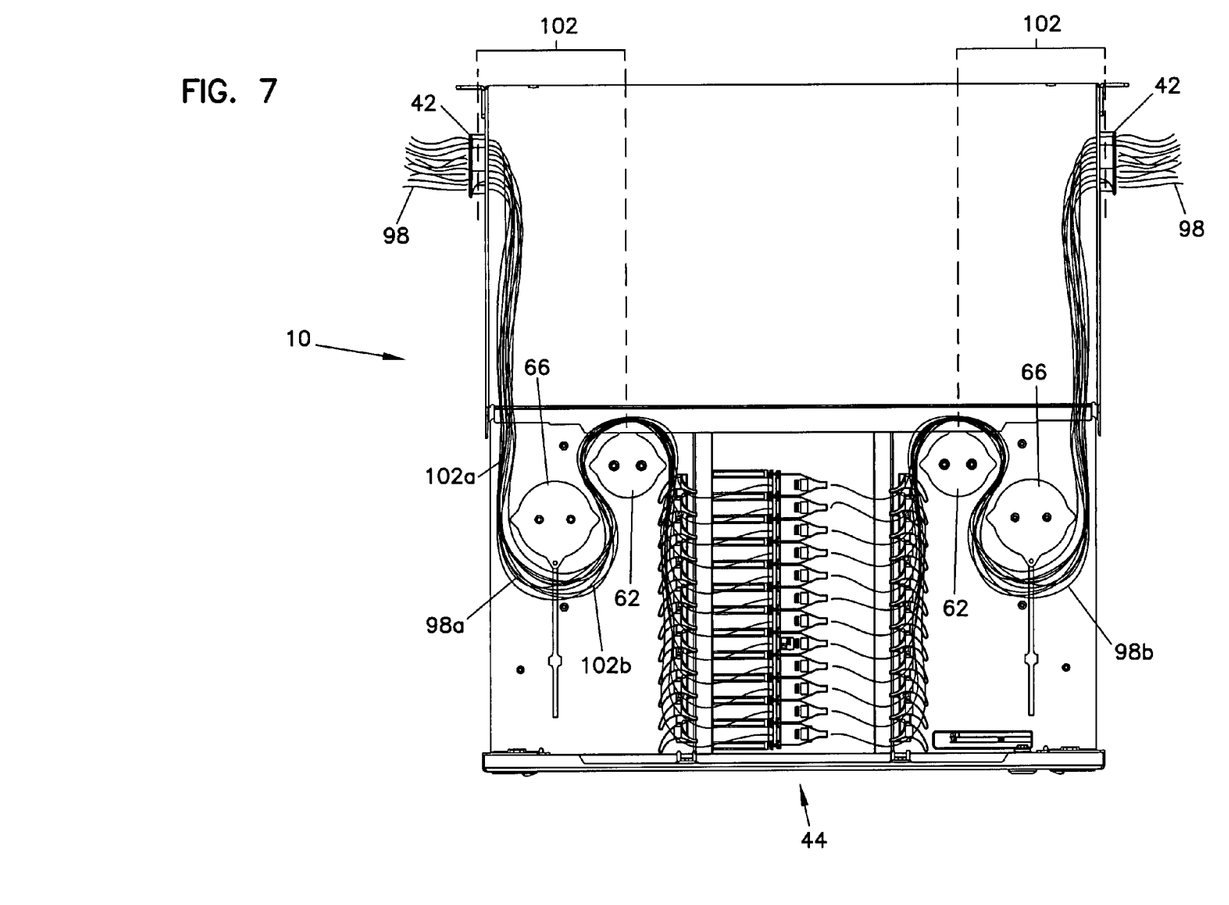
FIG. 7 is a top view of the cable management panel of FIG. 6, with the drawer in the open position.
Figure 8:
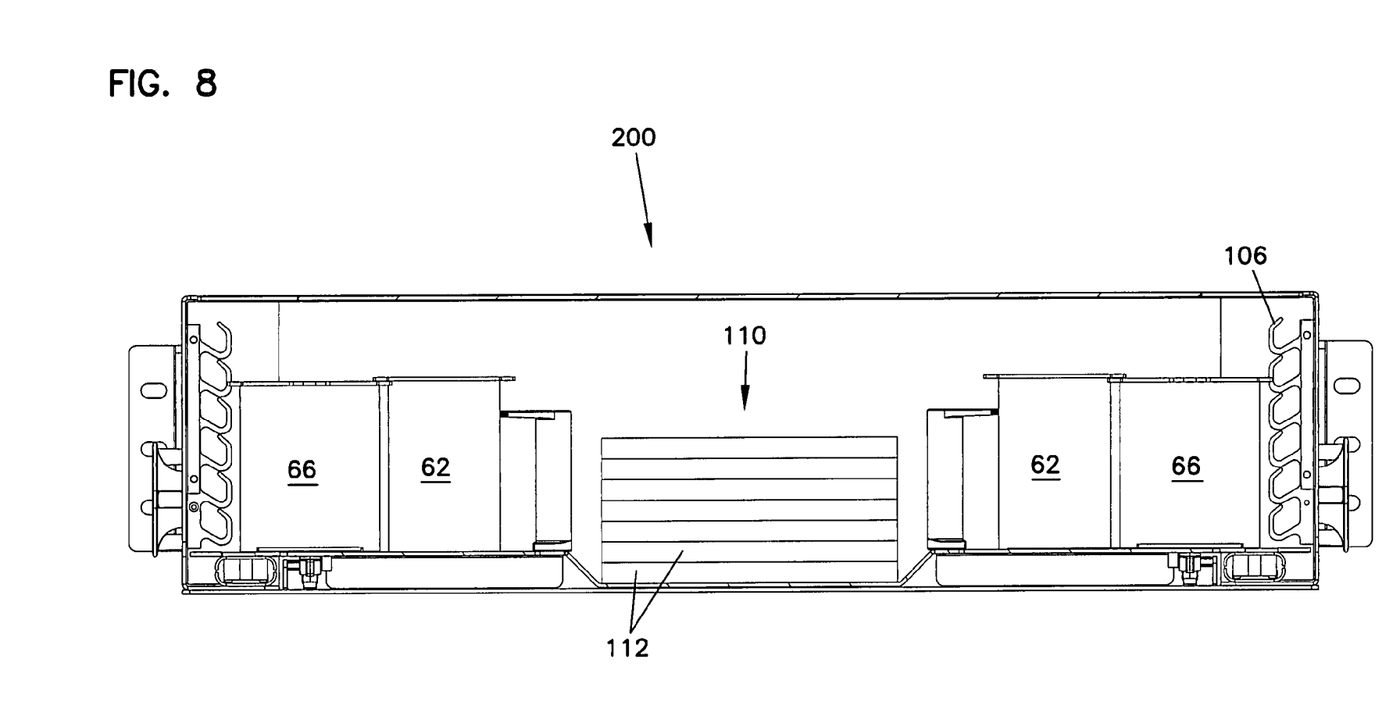
FIG. 8 is a cross-sectional front view of a second embodiment of a cable management panel, and showing splice trays.

Panel 10 of FIGS. 1–7 includes fiber terminations 44 for connecting pairs of fiber optic cables 98 terminated by fiber optic connectors, for example SC type connectors. In FIGS. 6 and 7, left side cables 98a are connected to right side cables 98b through terminations 44. A further embodiment of a panel 200 of FIG. 8 includes splices 110 for connecting cables 98a, 98b together.

A front panel 26 of drawer 14 of panel 10 includes latches 30 for latching to chassis 12. A lock 28 allows for drawer 14 to be selectively locked to chassis 12. A base 34 of drawer 14 supports the cable management structure. Drawer slides 36 between chassis 12 and drawer 14 allow for horizontal sliding movement of drawer 14 relative to chassis 12.

Chassis 12 further includes side openings 40 in sides 20, 21 for entry and exit of cabling. Side openings 40 can include a radius limiter 42, in the form of a trumpet flare, to provide cable bend radius protection as shown in FIGS. 1–7. Alternatively, a cable clamp 350 or a tie-off can be mounted to chassis 12 adjacent to side opening 340 as shown in a panel 300 of FIG. 9. Cable clamp 350 clamps to a cable on an exterior of chassis 12. The cables then enter chassis 12 for management on drawer 14.

Terminations 44 of drawer 14 include adapter modules 46 which define a plurality of termination locations for terminating fiber optic cables. The adapter modules are preferably movably mounted to drawer 14. Longitudinal guides 48 extend upward from base 34. Movable modules 46 slide with upward movement relative to guides 48. Latches 52 allow for selective movement of modules 46. Modules 46 preferably hold a plurality of fiber optic adapters 54 for use in connecting two fiber optic cables terminated by connectors. Further details of a sliding adapter arrangement like that shown is described in U.S. Pat. No. 5,497,444, the disclosure of which is incorporated by reference.

Drawer 14 preferably includes a plurality of cable guide fingers 58 for directing cabling in an organized manner on drawer 14. Drawer 14 further includes stationary radius limiters 62 including cable retention tabs 64. Radius limiter 62 has a convexly curved outer shape. In the preferred embodiment, radius limiter 62 defines a cylindrical portion. Cabling can be routed around stationary radius limiters 62 to organize and manage the cabling. Radius limiters 62 are positioned adjacent to a rear of drawer 14.

A moving radius limiter 66 is provided on drawer 14 to allow for cable management during movement of drawer 14 relative to chassis 12. Radius limiter 66 defines a cable take up mechanism. Without a moving radius limiter 66, excessive pulling on the cables may occur. Alternatively, if too much slack is provided in the cabling to allow for movement of drawer 14, such loose cables can be bent or crushed during sliding movement of the drawer 14.

Radius limiter 66 has a convexly curved outer shape. In the preferred embodiment, radius limiter 66 defines a cylindrical portion. Cabling is further routed around radius limiters 66 to organize and manage the cabling. Radius limiters 66 are positioned adjacent to a front of drawer 14 when the drawer is closed.

In panel 10, two sets of cable guide fingers 58, stationary radius limiter 62 and moving radius limiter 64, one on each side of panel 10, are provided to manage cables entering and exiting panel 10 at respective left and right sides 20, 21.

In the illustrated embodiment, moving radius limiter 66 includes a base 68, a cylindrical portion 70 extending upwardly from base 68, and an interior frame 72. A top 74 mounted to frame 72 includes cable retention tabs 75. Base 68 includes a plurality of holes 76 for engagement with a control mechanism 78 for controlling movement of radius limiter 66 during movement of drawer 14.

Movement of radius limiter 66 is controlled to have synchronized movement with drawer 14 to ensure that the cables do not bend too sharply when the drawer 14 is being opened or closed relative to chassis 12. If the cables are bent too sharply, this may cause loss of signal strength or loss of signal transmission. Preferably, panel 10 includes control mechanism 78 that is secured to drawer 14 to synchronize slidable movement of radius limiter 66 relative to slidable movement of drawer 14 within chassis 12. Radius limiter 66 moves with half the speed of drawer 14 in the preferred embodiment.

Control mechanism 78 includes an elongated body 80 with tabs 82 for mounting to base 68 of radius limiter 66. Control mechanism 78 further includes a rotating wheel 84 which includes a compressible outer ring 85. Tabs 82 each pass through hole 88 in base 34 of drawer 14, and then are slidably positioned in slot 86. Tabs 82 mount to base 68 of radius limiter 66. Ring 85 of wheel 84 engages a wall 92 of chassis 12 to cause relative movement of limiter 66. As shown in the drawings, base 34 includes raised sides 122 which are positioned above drawer slides 36 and control mechanism 78. Further details of a similar embodiment of a control mechanism are described in U.S. patent application Ser. No. 09/900,465, the disclosure of which is hereby incorporated by reference.

Figure 9:
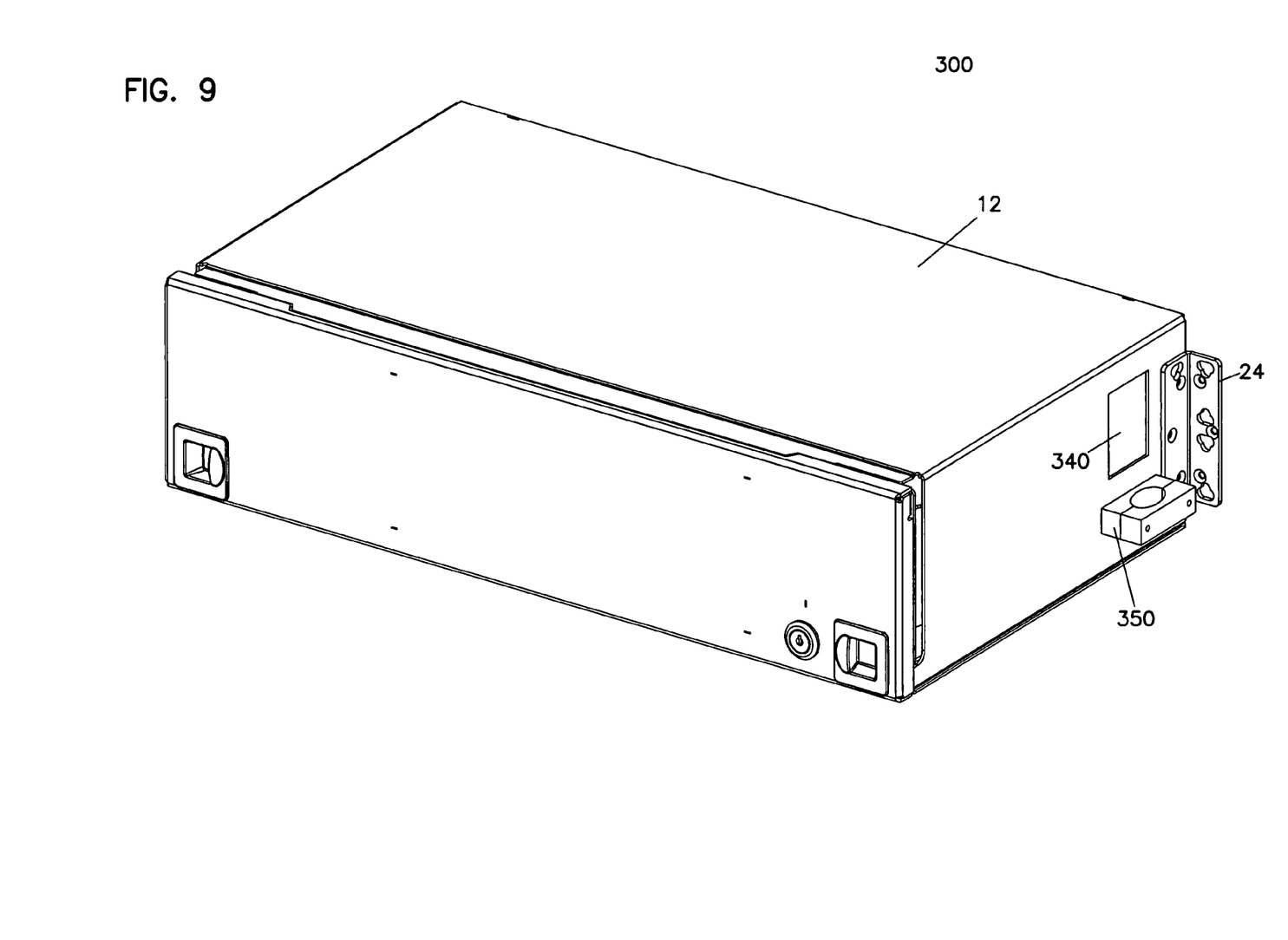
FIG. 9 is a front, top, and right side perspective view of a third embodiment of a cable management panel, including a cable clamp.

As shown in FIGS. 6 and 7, cabling 98 is provided on drawer 14 terminating at modules 46. Cabling 98 includes a cable loop portion 102 which is managed by stationary radius limiter 62 and moving radius limiter 66 so that the cables are not excessively pulled, nor is excessive looping developed within chassis 12. Loop portion 102 defines a cable pathway that travels 180 degrees around radius limiter 66. Loop portion 102 includes a forward portion 102a, and a rearward portion 102b. During movement of drawer 14, forward portion 102a, and rearward portion 102b change lengths, but have a combined length which is maintained so as to not pull cable length into chassis 12, or push cable length out of chassis 12. In this manner, the cables are protected from excessive pulling or bending. Also, the cables can be clamped adjacent to opening 40, as shown in FIG. 9, without causing damage to the cables.

To further assist with cable management, cable fingers 106 are positioned along a flange 108 of left and right sides 20, 21 of chassis 12. Cable fingers 106 and flanges 108 are only shown in FIGS. 3 and 5.

Drawer 14 can include other cable management structure within a central area 120 of base 34. For example, cable splicing 110 including splice trays 112 can be provided as shown in panel 300 of FIG. 9. Splice trays 112 connect cables together in the area of base 34 occupied by terminations 44 of panel 10.

Latch 30 includes a tab 126, and a spring 128 causes biased movement of latch 30. Tab 126 engages a hole 130 on chassis 12 in order to latch drawer 14 to chassis 12. A tab 134 on lock 28 prevents movement of latch 30 to allow for locked retention of drawer 14 on chassis 12.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable management panel comprising:
   (a) a chassis having a front, a rear, and opposite sides, one of the opposite sides defining an access location allowing entry of optical fiber cable into an interior of the chassis;
   (b) a drawer slidably mounted within the chassis, the drawer slidable between a first position with the drawer fully inserted within the chassis toward the chassis rear, and a second position with the drawer extended from the interior of the chassis away from the chassis rear;
   (c) a cable radius limiter slidably mounted on the drawer and movable from a first position on the drawer toward a second position on the drawer;
      (i) the second position being forward of the first position;
   (d) a control mechanism to move the radius limiter between the first and second positions as the drawer is moved between the second and first positions;
      (i) the control mechanism moving the radius limiter in synchronized movement with movement of the drawer relative to the chassis;
      (ii) wherein a slack loop pathway of optical fiber cable is defined within the interior of the chassis, wherein the slack loop pathway extends 180 degrees around the cable radius limiter.

2. The cable management panel of claim 1 wherein:
(a) the control mechanism includes a rotating member engaged with at least one of the chassis and the drawer.

3. The cable management panel of claim 2 wherein:
(a) the rotating member includes a wheel.

4. The cable management panel of claim 1 wherein:
(a) the access location is a first access location;
(b) the cable radius limiter is a first cable radius limiter;
(c) the cable management panel further comprises a second cable radius limiter, the first cable radius limiter being adjacent to one opposite side of the chassis and the second cable radius limiter being adjacent to the other opposite side of the chassis; and
(d) the chassis defining a second access location in the other opposite side.

5. The cable management panel of claim 1, further comprising cable fingers mounted to one of the opposite sides.

6. The cable management panel of claim 1, further comprising a cable clamp mounted to an exterior surface of one of the opposite sides.

7. A cable management panel comprising:
(a) a chassis defining an interior, the chassis including two opposite sides, each opposite side defining a cable access opening;
(b) a drawer slidably mounted within the chassis interior, the drawer slidable between a first position with the drawer fully inserted within the chassis interior, and a second position with the drawer extended from the interior of the chassis;
(c) two cable take-up mechanisms each including a first radius limiter slidably mounted on the drawer and movable from a first location on the drawer toward a second location on the drawer;
　(i) the second location being forward of the first location;
　(ii) each first radius limiter being slidably mounted to the chassis; and
　(iii) each first radius limiter including a convexly-curved vertical surface extending upwardly from the drawer;
　(iv) each first radius limiter including a first cable retention tab spaced vertically away from the drawer and adjacent to the convexly-curved vertical surface;
(d) a control mechanism to control movement of the first radius limiters relative to the drawer;
　(i) the control mechanism moving each first radius limiter between the first and second locations as the drawer is moved between the second and first position; and
　(ii) the control mechanism moving each first radius limiter in synchronized movement with movement of the drawer relative to the chassis;
(e) two second radius limiters mounted to the drawer, each one of the second radius limiters cooperating with one of the first radius limiters and one of the access openings to define a cable slack loop pathway within the chassis having a length defined by a forward portion and a rearward portion, wherein movement of the drawer moves each of the first radius limiters relative to the drawer and maintains the length of the cable slack loop pathway.

8. The cable management panel of claim 7 wherein:
(a) the control mechanism includes a rotating member engaged with at least one of the chassis and the drawer.

9. The cable management panel of claim 8 wherein:
(a) the rotating member includes a wheel.

10. The cable management panel of claim 7 wherein:
(a) the first radius limiters include cylindrical portion.

11. A method of using a cable management panel comprising:
(a) providing a chassis with a drawer slidably mounted within the chassis; and a cable take-up mechanism including a radius limiter slidably mounted on the drawer;
　(i) the radius limiter being slidably mounted to the chassis; and
　(ii) the radius limiter including a convexly-curved vertical surface extending upwardly from the drawer;
(b) moving the drawer relative to the chassis;
(c) during the step of moving the drawer, controlling movement of the radius limiter relative to the drawer to synchronize movement of the radius limiter relative to the chassis;
(d) passing cable through an opening of a sidewall of the chassis;
(e) passing cables 180 degrees around the radius limiter.

* * * * *